Feb. 20, 1951 — R. Z. SCHREFFLER — 2,542,581
HOLLOW GLASS BLOCK WALL
Filed Sept. 13, 1945
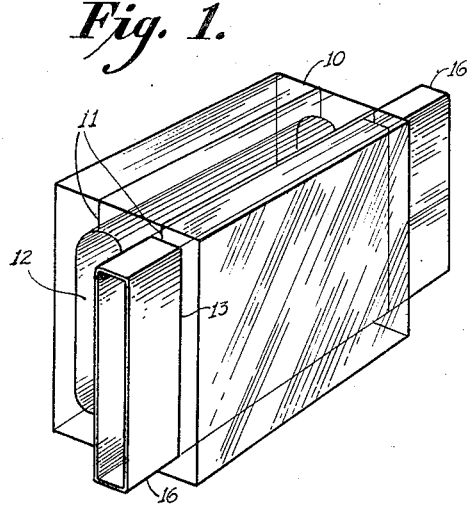
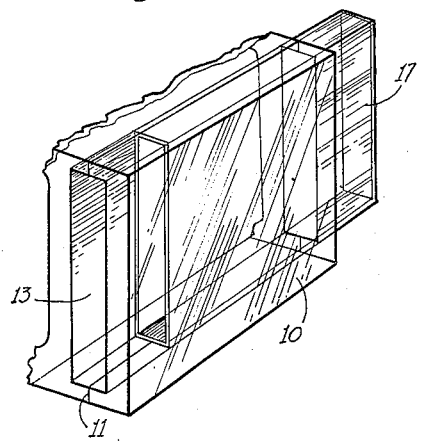
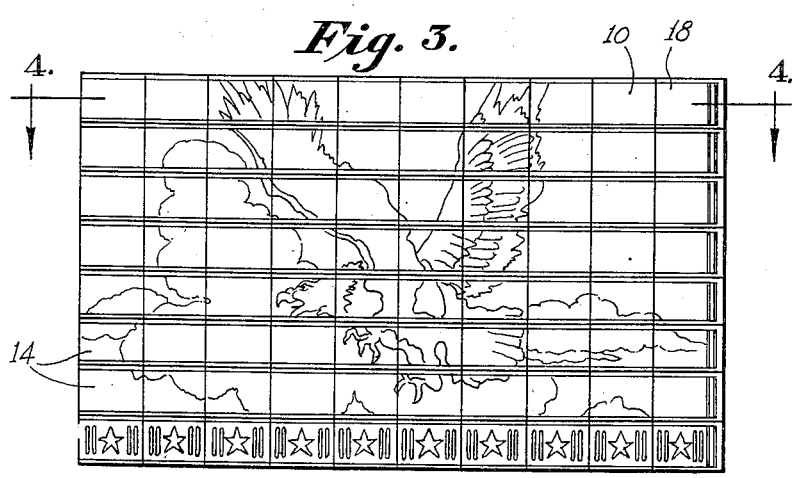
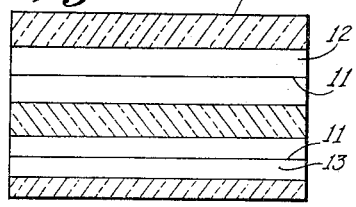
ROBERT Z. SCHREFFLER, Inventor
By Harley L. Parrott, his Attorney Patented Feb. 20, 1951

2,542,581

UNITED STATES PATENT OFFICE 2,542,581

HOLLOW GLASS BLOCK WALL

Robert Z. Schreffler, Philipsburg, Pa.

Application September 13, 1945, Serial No. 616,081

1 Claim. (Cl. 72—41)

This invention relates to building structures and to building units adapted for use in such structures.

According to modern practice it is common to use glass building blocks in the construction of walls and panels, and the like. The glass building blocks are laid up in superimposed courses with bonded joints much in the same way that the ordinary types of building block are arranged. Glass blocks are ordinarily used to create special appearance effects in building structures and their use is currently increasing for this purpose.

An objection, however, to building structures, such as walls and panels, which are made up of glass building blocks of a type now commonly in use, is that unlike other comparable building structures their appearance is not flexible. That is, once the appearance effect for a given installation is decided upon, the effect is fixed for the life of the structure. It is not possible, for example, to vary the effect with paint or wallpaper or other covering material as is the case with other similar building structures.

In accordance with the present invention I have devised a means for overcoming this disadvantage of the type of glass building block heretofore in use so as to render the decorative effect obtainable with glass blocks widely flexible. According to my invention the glass building block is formed with an internal open-ended way disposed horizontally with respect to the position assumed by the glass block when it is arranged in building structures, and substantially coextensive with a vertical face of the block. This internal way in each individual block is adapted to register at each end face of the block with the corresponding ways in other blocks so as to form a continuous internal way when the blocks are arranged in a course in a building structure. The continuous internal way formed in this manner provides a channel in the glass blocks after they have been incorporated in the building structure which is adapted for the reception of a removable decorative insert which may be selected to invest the glass blocks with any particular appearance effect desired. In many cases it is possible to arrange the glass block building structure so that an open end of the continuous internal ways through the courses is accessible for insertion and removal of decorative inserts. In some cases, however, it may be necessary to make special provision for access openings and in these instances special terminal glass blocks of the type disclosed in the present invention may be provided in which the internal way opens at one end at an end face to register as previously described with the corresponding ways in other blocks, and opens at the other end in a vertical face of the blocks so as to provide a freely available access opening for arranging the decorative inserts.

My invention is illustrated in the accompanying drawing in which:

Fig. 1 is a perspective view of a glass building block constructed in accordance with my invention;

Fig. 2 is a corresponding horizontal section;

Fig. 3 is an elevation illustrating an arrangement of the glass building blocks of my invention in a building structure with decorative inserts in place;

Fig. 4 is a section on the line 4—4 of Fig. 3; and,

Fig. 5 is a fragmentary detail corresponding to Fig. 1, and illustrating a modified form of gasket for use in assembling the glass building blocks.

As illustrated in the drawing, the glass building blocks of my invention comprise a rectilinear glass body 10 which may be formed according to usual methods employed in manufacturing glass blocks of the type heretofore in use. The surface of the glass body 10 is illustrated in Fig. 1 in which the body 10 is shown built up of segments assembled at cemented or otherwise bonded joints (as at 11 in Fig. 1) to constitute the body 10. When formed in this manner the body 10 is readily arranged with insulation spaces (as at 12 in Fig. 1) if desired, although these insulation spaces 12 may be omitted whenever their use is not indicated, and with the open-ended internal ways 13 arranged for the reception of decorative inserts in accordance with the present invention. The body 10 may of course be otherwise cast in one piece if desired. The body 18 is the same as the body 10 except that instead of having the openings in either end of the block for the channel, one of the openings is in the face of the block.

As indicated in Fig. 1 and shown more in detail in Fig. 2 the internal way 13 is disposed horizontally with respect to the position assumed by the glass body 10 when incorporated in a building structure, and the internal way 13 is extended as near as practicable to the top and bottom faces of the body 10 so as to be substantially coextensive with a vertical face.

When incorporated in a building structure the glass building blocks are arranged in superimposed courses (as at 14 in Fig. 3); the glass blocks 10 being assembled in the building structure with mortar or cement or other bonding material in the usual manner. As the glass blocks 10 are built up in this manner to form a building structure they are aligned so that the internal ways 13 which are adapted to register at the end faces of the blocks 10 are disposed to form a continuous internal channel through each course of the blocks 10 and thus provide a channel for the reception of a decorative insert as indicated at 15 in Fig. 4. The decorative inserts 15 are preferably made of flexible plastic material or the like possessing sufficient body to allow it to be inserted and removed readily from the continuous channels formed by the internal ways 13. As the internal ways 13 are substantially coextensive with the vertical faces of the blocks 10 they will present the effect of an integrated pattern when inserted in all of the courses such as is illustrated in Fig. 3.

To maintain the continuous channels formed by the internal ways 13 entirely clear as the glass blocks are assembled into a building structure, a gasket 16 may be employed as illustrated in Fig. 1 to prevent the mortar or other bonding material from flowing into the internal ways 13. The gasket 16 may be made of any suitable material such as metal or wood or heavy paper, and may in fact serviceably consist of a wooden block. In any case the gasket 16 is inserted in the internal way 13 as the glass block 13 is disposed for assembly in the building structure. As the gasket 16 extends at each end of the internal way 13 one of these ends may be inserted in the corresponding channel of the previously assembled glass block so that the mortar applied to the joint end faces cannot flow into the internal ways. It will be seen that the gasket 16 also serves the useful function of aligning the glass blocks with the internal ways 13 in registry as they are assembled. The gasket 16 may be adapted for use as just described to maintain the internal ways 13 clear of mortar at the joints and to align the blocks 10 as they are set in place, and then removed from each block 10 as it is laid up; or the gaskets 16 may be arranged to remain in the internal ways 13 after the blocks are assembled as illustrated in Fig. 5 at 17. In this latter case, the gasket 17 would only project from one end of the internal ways 13, and would be spaced from the other end to allow insertion of the corresponding gasket 17 of an adjoining block. Also, when gaskets 17 are used, it will apparent that they should possess the same transparency characteristics as blocks 10, and that the gaskets 17 might be formed integral with the blocks 10 if desired.

The internal ways 13 may be arranged to form either horizontal or vertical channels through the courses of building blocks 10 as desired, although the horizontal disposition will probably be more practical and convenient in most instances.

I claim:

A vertical wall comprised of glass building blocks arranged in superposed courses of blocks to form the vertical face of the wall, each course of said wall comprised of a plurality of glass blocks each individual block having a horizontal open-ended internal way substantially parallel to and extending the full extent of the vertical face of the block from end to end and registering at each end face of each block with an adjacent block in the said plurality, and a second group of building blocks arranged in vertical correspondence, one in each course, each of said first blocks and each block of said second group having an internal open-ended way which registers at one end face with the corresponding end face of an adjacent block in its course so as to preserve the continuity of the internal ways, the other open ends of the internal ways in said second group of blocks opening in a vertical wall face of said blocks to provide an access opening for the reception of inserts to be positioned within the unobstructed internal ways in the blocks forming the courses of the wall.

ROBERT Z. SCHREFFLER.

REFERENCES CITED

The following references are of record in the file of this patent:

UNITED STATES PATENTS

| Number | Name | Date |
|---|---|---|
| 402,073 | Falconnier | Apr. 23, 1889 |
| 689,523 | Trumbull | Dec. 24, 1901 |
| 750,561 | Allerding | Jan. 26, 1904 |
| 1,142,518 | Hinde | June 8, 1915 |
| 1,203,934 | Straight | Nov. 7, 1916 |
| 1,215,149 | Heath | Feb. 6, 1917 |
| 1,277,829 | Baum | Sept. 3, 1918 |
| 1,334,599 | Cusick | Mar. 23, 1920 |
| 1,827,167 | Regan | Oct. 13, 1931 |
| 1,854,314 | Ryan | Apr. 19, 1932 |
| 2,029,876 | Klein | Feb. 4, 1936 |
| 2,167,764 | Lytle | Aug. 1, 1939 |
| 2,309,233 | Black | Jan. 26, 1943 |
| 2,392,552 | Roe | Jan. 8, 1946 |

FOREIGN PATENTS

| Number | Country | Date |
|---|---|---|
| 117,215 | Great Britain | July 11, 1918 |
| 229,795 | Great Britain | Mar. 5, 1925 |
| 805,130 | France | 1936 |